US011713602B2

(12) United States Patent
Sturm et al.

(10) Patent No.: US 11,713,602 B2
(45) Date of Patent: Aug. 1, 2023

(54) MOTOR VEHICLE DOOR LOCK

(71) Applicant: Kiekert AG, Heiligenhaus (DE)

(72) Inventors: Christian Sturm, Krefeld (DE); Michael Scholz, Essen (DE); Holger Schiffer, Meerbusch (DE); Bernhard Drost, Isselburg (DE)

(73) Assignee: Kiekert AG, Heiligenhaus (DE)

( * ) Notice: Subject to any disclaimer, the term of this patent is extended or adjusted under 35 U.S.C. 154(b) by 530 days.

(21) Appl. No.: 16/333,256

(22) PCT Filed: Aug. 1, 2017

(86) PCT No.: PCT/DE2017/100648
§ 371 (c)(1),
(2) Date: Mar. 28, 2019

(87) PCT Pub. No.: WO2018/050149
PCT Pub. Date: Mar. 22, 2018

(65) Prior Publication Data
US 2019/0249470 A1 Aug. 15, 2019

(30) Foreign Application Priority Data
Sep. 14, 2016 (DE) ............... 10 2016 117 279.0

(51) Int. Cl.
*E05B 83/24* (2014.01)
*E05B 81/14* (2014.01)
(Continued)

(52) U.S. Cl.
CPC ............ *E05B 83/24* (2013.01); *B60R 25/01* (2013.01); *B60R 25/24* (2013.01); *E05B 79/20* (2013.01);
(Continued)

(58) Field of Classification Search
CPC .......... E05B 83/24; E05B 81/14; E05B 81/56; E05B 81/66; B60R 25/01
See application file for complete search history.

(56) References Cited

U.S. PATENT DOCUMENTS

| 8,935,053 B2 | 1/2015 | Wheeler et al. |
| 10,246,911 B2* | 4/2019 | Marasco ................. E05B 81/10 |

(Continued)

FOREIGN PATENT DOCUMENTS

| DE | 19501493 A1 | 7/1996 |
| DE | 29722484 U1 | 2/1998 |

(Continued)

OTHER PUBLICATIONS

International Search Report and Written Opinion for corresponding Patent Application No. PCT/DE2017/100648 dated Nov. 16, 2017.

*Primary Examiner* — Kristina R Fulton
*Assistant Examiner* — Noah Horowitz
(74) *Attorney, Agent, or Firm* — Renner, Otto, Boisselle & Sklar, LLP

(57) ABSTRACT

A motor vehicle door lock, such as a motor vehicle bonnet lock includes a locking mechanism which substantially consists of a rotary latch and a pawl. The locking mechanism interacts with a striker element on a bonnet. The lock further has an unlocking/opening mechanism for the bonnet, which mechanism is equipped with a release element provided in the interior of a motor vehicle body. The release element is operated twice to open the bonnet. The locking mechanism is transferred to a pre-latched position after the release element has been operated at least once, with the striker element still being trapped. The bonnet is opened from the pre-latched position by lifting the pawl off the rotary latch with the aid of a power mechanism, said lifting being activated separately.

13 Claims, 3 Drawing Sheets

Figure 1:
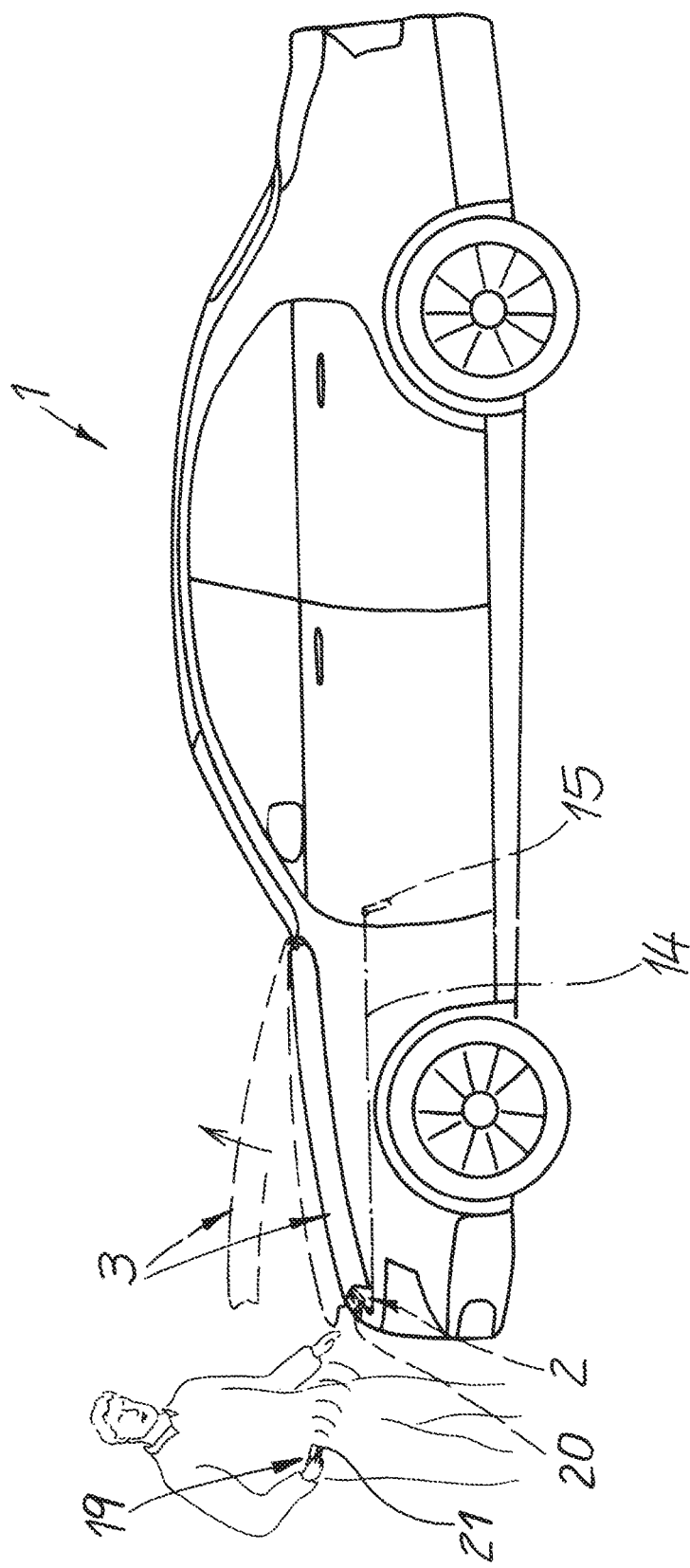

(51) Int. Cl.
*E05B 81/66* (2014.01)
*E05B 81/56* (2014.01)
*E05B 79/20* (2014.01)
*E05B 81/06* (2014.01)
*B60R 25/01* (2013.01)
*B60R 25/24* (2013.01)
*E05B 47/00* (2006.01)

(52) U.S. Cl.
CPC .............. *E05B 81/06* (2013.01); *E05B 81/14* (2013.01); *E05B 81/56* (2013.01); *E05B 81/66* (2013.01); *E05B 2047/0095* (2013.01); *E05Y 2900/536* (2013.01)

(56) References Cited

U.S. PATENT DOCUMENTS

| | | | | |
|---|---|---|---|---|
| 10,508,480 | B2 * | 12/2019 | Peng | E05B 81/66 |
| 10,584,520 | B2 * | 3/2020 | Scholz | E05B 81/14 |
| 10,669,751 | B2 * | 6/2020 | Kim | E05B 81/72 |
| 10,731,388 | B2 * | 8/2020 | Ilea | E05B 83/24 |
| 10,808,436 | B2 * | 10/2020 | Cuddihy | E05B 83/24 |
| 10,890,018 | B2 * | 1/2021 | Distefano | E05B 79/20 |
| 2014/0088826 | A1 | 3/2014 | Wheeler et al. | |

FOREIGN PATENT DOCUMENTS

| | | | |
|---|---|---|---|
| DE | 10251386 | A1 | 5/2004 |
| DE | 10356976 | A1 | 9/2004 |
| DE | 19938687 | B4 | 10/2007 |
| DE | 102009037037 | A1 | 2/2011 |
| DE | 102011003808 | A1 | 8/2012 |
| DE | 102012212542 | A1 | 2/2013 |
| DE | 202012007312 | U1 | 11/2013 |
| DE | 102013217377 | A1 | 3/2015 |
| DE | 102014001789 | A1 | 8/2015 |
| DE | 102014003737 | A1 | 9/2015 |
| DE | 102015113851 | A1 | 3/2016 |
| DE | 102014118635 | A1 | 4/2016 |
| EP | 1637674 | A1 | 3/2006 |
| WO | 2015139678 | A1 | 9/2015 |

* cited by examiner

MOTOR VEHICLE DOOR LOCK

The invention relates to a motor vehicle door lock, particularly a motor vehicle bonnet lock, provided with a locking mechanism which substantially consists of a rotary latch and a pawl. The locking mechanism interacts with a striker element on a bonnet, which further has an unlocking/opening mechanism for the bonnet, which mechanism is equipped with a release element provided in the interior of a motor vehicle body. It is required to operate the release element preferably twice to open the bonnet.

Familiar motor vehicle door locks or motor vehicle bonnet locks are regularly equipped with a catch hook and are therefore called hook locks. An example of such a hook lock is described in DE 199 38 687 B4. The hook lock in this context provides, in addition to the locking mechanism which consists of the rotary latch and pawl, a secure locking bolt or striker element.

In order to open such a motor vehicle door lock or hook lock, the unlocking/opening mechanism must first be used to unlock and open the locking mechanism. After that, the respective bonnet with a defined gap between the motor vehicle body, is opened through the force of a spring. The catch hook hereby still ensures that the striker element is secure. To open the bonnet, the operator must now get out of the vehicle and at the front, swivel the catch hook away from the striker element through the aforementioned gap. This is uncomfortable to do.

This is why the category-defining state of the art according to DE 10 2012 212 542 A1 describes a motor vehicle door lock and in particular a motor vehicle bonnet lock that can be opened from inside a motor vehicle body through the two-time actuation of an unlocking mechanism or the unlocking/opening mechanism. The first actuation of the release element inside the motor vehicle body triggers the initial unlocking of the motor bonnet locking mechanism. The previously described gap between the bonnet and motor vehicle body is set in this instance. A second actuation of the release element now ensures that a second motor bonnet locking mechanism is unlocked and opened, so that the bonnet is finally released and can be lifted up.

To prevent the bonnet from being opened accidentally, the familiar instruction according to DE 10 2012 212 542 A1 proposes a motor bonnet unlocking switch that is scanned. A corresponding signal can therefore be transmitted to the driver. With this familiar instruction, a motor bonnet warning indicator is provided for this purpose that appears on a display.

The state of the art has fundamentally been proven, but there is still room for improvement. Malfunctions of the familiar motor bonnet locking switch are therefore conceivable, especially since they are located in a particularly critical place inside the motor compartment where they are subjected not only to heat but also in some cases to oil, spray water, etc. In addition to this, it is also conceivable for the driver to just simply fail to notice the relevant warning signal or for the display to malfunction. Then there is still the possibility that the motor vehicle is moved whilst the bonnet is open so that the bonnet opens accidentally, thus impeding the driver's view ahead. This is a major safety risk.

The invention is based on the technical problem of further developing such a motor vehicle door lock in such a way that safety is increased significantly with a simple design.

In order to solve this technical problem, with a class-specific motor vehicle door lock, the locking mechanism is transferred to a pre-latched position after the release element has been operated at least once, with the striker element still being trapped, and the bonnet is opened or can be opened from the pre-latched position by lifting the pawl off the rotary latch with the aid of a power mechanism, with said lifting being activated separately.

Lifting the pawl off the rotary latch with the aid of a power mechanism, with lifting being activated separately, is generally realized using a separate operating unit to the release element provided in the interior of the motor vehicle body. A particular advantage of the operating unit is that it initiates the wireless lifting off of the pawl with the aid of a power mechanism, with lifting being activated separately, and is therefore usually carried by the driver. A wireless key has proven to be preferable in this instance.

This wireless key is usually needed anyway to control the motor vehicle remotely. For instance, the wireless code can be used to unlock the individual motor vehicle door locks. Within the context of the invention, the wireless code or the operating unit, that is separate to the release element and preferably remote controllable, has an additional function. For, in order to open the bonnet, the locking mechanism must first be unlocked from the rotary latch and pawl, and usually also opened, by operating the release element at least once in the interior of the motor vehicle body. The bonnet is hereby transferred to the pre-latched position. At the same time, a spring or several springs on the bonnet that prepare for opening, ensure that there is a gap between the bonnet and motor vehicle body.

The operator can then grip the bonnet through this gap and open it. This however is not possible in the pre-latched position. For, in the pre-latched position, the pawl engaged in the pre-latch of the rotary latch ensures that the striker element is secure and thus also the bonnet. In order to now be able to swing open the bonnet from the pre-latched position, the pawl is lifted off the rotary latch with the aid of a power mechanism, with lifting being activated separately by the wireless operating unit or wireless code.

An actuator is therefore usually provided for the power-driven application of the pawl. The actuator can be a swivel and/or linear actuator. In the first scenario of a swivel actuator, the respective swivel actuator ensures indirectly or directly that the pawl is lifted off the rotary latch or pre-latch of the rotary latch, namely through a swiveling movement. The linear motor has the same effect, in that an adjusting rod is used to swivel the pawl. As a result, the operator can now swing open the bonnet.

For this purpose, the actuator in question must be impinged by the operating unit that is separate to the release element and preferably by the wireless code, as previously already described in detail. In this context it is conceivable that the operating unit or wireless code is individualized by the driver or that the position of an operating unit is absolutely necessary at the front of the motor vehicle bonnet lock. The individualization of the operating unit or wireless code with regard to the driver is for instance conceivable to such an extent that the driver for example has to log in by means of a fingerprint on the operating unit or wireless code, thereby ensuring that only, and exclusively, the driver can use the operating unit or respectively the wireless code.

A local restriction of the position of the operating unit or wireless code can therefore be easily applied so that the inventive motor vehicle door lock is equipped with its own transmitting/receiving unit that can communicate with a corresponding transmitting/receiving unit of the operating unit—and only that one. By restricting the range of this communication to an area of for example 1 m or 2 m, this ensures that the operator can only successfully use the operating unit to lift the pawl off the rotary latch in the pre-latched position of the locking mechanism, if he is directly near the motor vehicle door lock in question or near the bonnet. This increases the level of safety considerably since, according to the invention, opening the bonnet actively requires a twofold process from the operator.

First, the operator must lift the pawl off the rotary latch starting from the pre-latched position of the locking mechanism and with the aid of a power-driven actuator. But before all that can happen, the pre-latched position of the locking mechanism must be taken, namely through the release element used by the operator. The actuator can now lift the pawl off the rotary latch. This is only possible if the operator is in the direct vicinity of the motor vehicle door lock or motor vehicle bonnet lock. To swing open the bonnet, the operator can then reach through the gap between the bonnet and the motor vehicle body and grab the bonnet and swing it upwards. This assures maximum safety and scenarios can be ruled out and controlled where the bonnet is opened and the vehicle can still be moved.

In this context, it is of course also possible to issue a warning signal with the aid of a sensor if the operator does not swing open the bonnet after lifting the pawl off the rotary latch out of the pre-latched position. This warning signal can basically also be used to prevent the vehicle from moving off.

Thanks to the advantageous design, the previously described actuator also features an actuator, in addition to the mandatory electric motor. Depending on the design of the electric motor or actuator, the actuator can be a swivel actuator and/or a linear actuator.

In addition to this, an additional sensor can be provided that scans the pre-latched position. This sensor can also be coextensive with the sensor that detects the fully opened and removed bonnet and emits the aforementioned warning signal. In any case, the sensor and actuator are connected to a common control unit.

The design chosen is such that the control unit only permits the application of the actuator to lift off the pawl if the sensor has signaled the pre-latched position of the locking mechanism. This provides yet more enhanced safety. For, with the aid of the sensor that scans the pre-latched position, this guarantees that the additional operating unit only works and can only work to lift the pawl off the rotary latch out of the pre-latched position with the aid of a power mechanism, with lifting being activated separately, if it engages in the pre-latch of the rotary latch. In other words, the operating unit that is separate to the release element in the interior of the motor vehicle for the wireless application of the actuator can definitely not lift the pawl off the rotary latch as long as the respective motor vehicle door lock and thus the locking mechanism are in a locked state or in the main latched position. Rather, the separate operating unit can only lift the pawl off the rotary latch if the locking mechanism is actually in the pre-latched position. This again enhances the level of safety.

As part of the operation, the process generally involves actuating the release element located in the interior of the motor vehicle body once to transfer the locking mechanism to the pre-latched position. The successful capture of the pre-latched position is hereby scanned by the sensor that registers the pre-latched position. After the one-off actuation of the release element, the bonnet can then be opened, namely through the previously described application of the operating unit. Within this context, the application of the operating unit only leads to the lifting of the pawl off the rotary latch if the locking mechanism is already secure in the pre-latched position and the sensor in question has signaled this to the common control unit for the sensor and actuator.

In principle, in order to perform the operation, it is also possible to actuate the release element twice to transfer the locking mechanism to the pre-latched position and to then finally open the bonnet by initiating the operating unit. Actuating the release element twice is for example recommended where the motor vehicle door lock or bonnet lock is not located centrally at the front of the motor vehicle but for instance where two motor vehicle door locks are located on the lateral longitudinal edges of the bonnet, that have to be transferred separately with the aid of the release element to the pre-latched position. Of course, where there is only a single motor vehicle door lock, the operating procedure involves actuating the release element twice to transfer the locking mechanism to the pre-latched position.

In any case, the capture of the pre-latched position by the locking mechanism with the aid of the sensor is and should of course be checked and scanned in this instance, which also registers the pre-latched position. Only once the pre-latched position has been successfully captured, can the operating unit that is separate to the release element, initiate the actuator wirelessly so that the pawl is lifted off the pre-latched position at the rotary latch and the bonnet can be fully opened.

As a result, a motor vehicle door lock is provided that, based on a remarkably simple design, offers considerable gain in safety relative to the state of the art. For the opening of the bonnet is initially independent of any sensor signals, since the bonnet can generally always be transferred to a partially opened position with the aid of the release element. Since the motor vehicle door lock assumes its pre-latched position in this partially opened position, the striker element is secured without change. Only when the operator is in the immediate vicinity of the bonnet to be opened and at the same time actively actuates the operating unit that is separate to the release element in the interior of the motor vehicle body, can the bonnet even be opened. These are the fundamental advantages.

Figure 2:
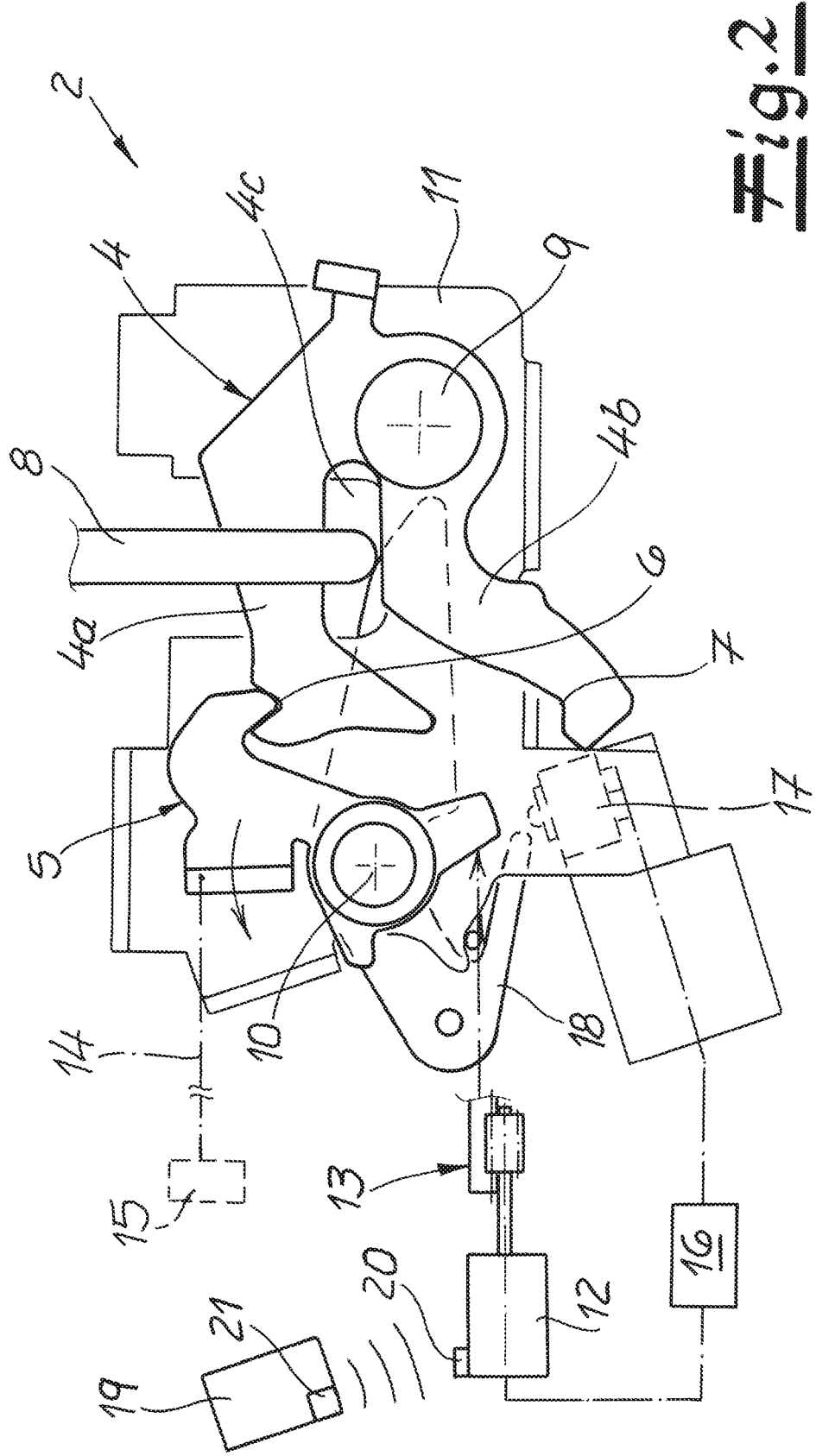
Figure 3:
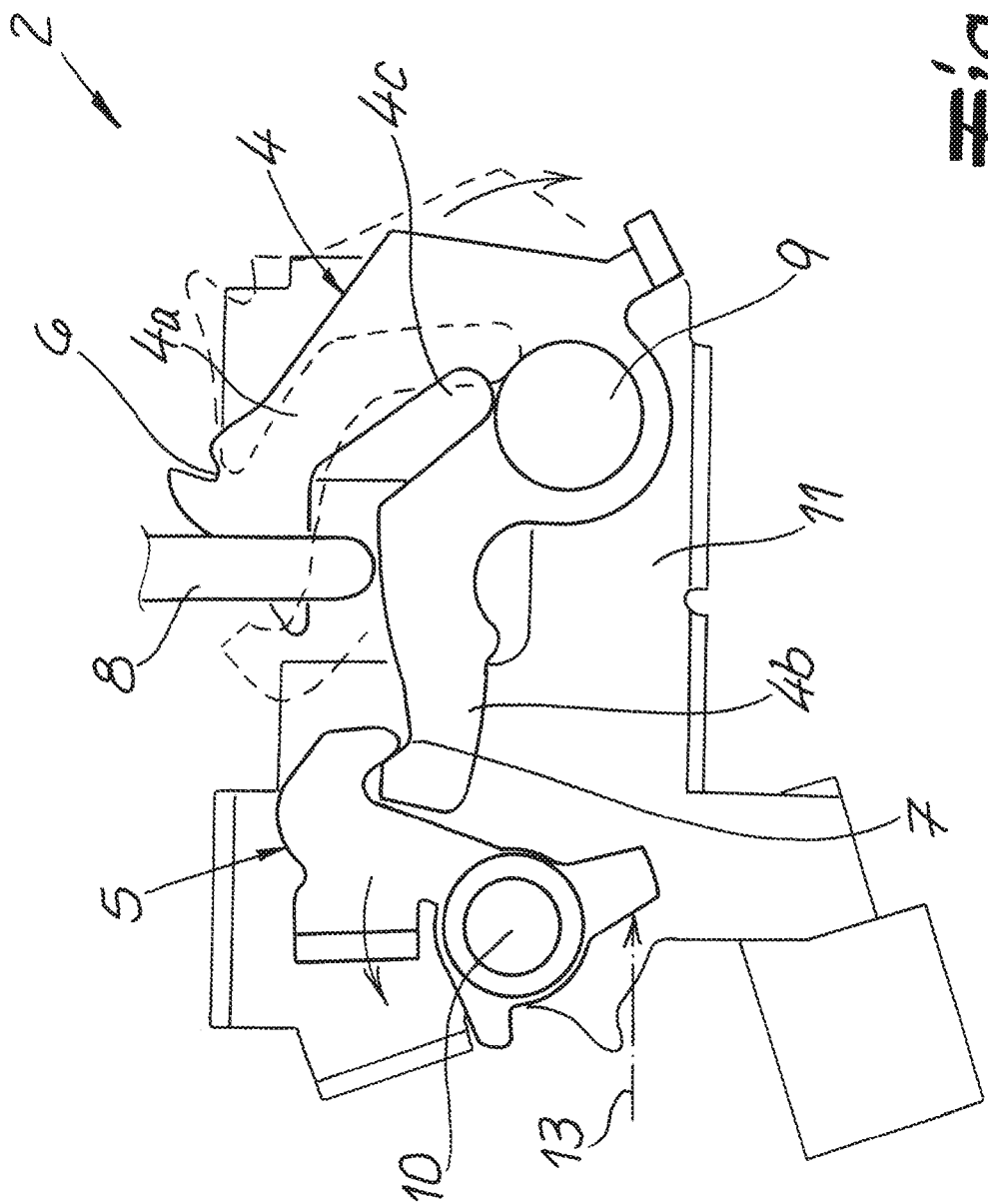

Hereinafter, the invention is explained in further detail on the basis of a drawing which only depicts an execution example. The following is shown:

FIG. 1 a motor vehicle together with the motor vehicle door lock according to the invention, FIG. 2 the motor vehicle door lock in detail when closed and FIG. 3 the motor vehicle door lock in the pre-latched position according to the invention and a suggested opening process.

The figures initially show a motor vehicle 1 that is equipped with a motor vehicle door lock and more precisely, a motor vehicle bonnet lock 2 according to the invention. The motor vehicle bonnet lock 2 is located in the front area of motor vehicle 1 and is used to secure a bonnet 3. In principle, the motor vehicle door lock can also be used to secure other motor vehicle doors, motor vehicle side doors, a trunk, motor vehicle lid or even a fuel cap. The term bonnet therefore includes all caps on motor vehicle 1.

The motor vehicle door lock or in the design example, the motor vehicle bonnet lock 2 has according to the detailed descriptions in FIGS. 2 and 3, a locking mechanism 4, 5 consisting essentially of a rotary latch 4 and pawl 5. With the rotary latch 4, this is a fork latch with two fork arms 4a, 4b. Fork arm 4a is designed as the main latch arm 4a. With fork arm 4b, this is a pre-latch arm 4b. The main latch arm 4a is equipped with a main latch or main latch recess 6. The pre-latch arm 4b accordingly has a pre-latch or pre-latch recess 7.

In the closed position or main latched position as per FIG. 2, the pawl 5 engages in the main latch 6. By way of contrast, the pre-latched position as per FIG. 3 specifies that the pawl 5 has engaged in the pre-latch 7. In both cases, i.e. both in the closed position or main latched position of the locking mechanism 4, 5 as per FIG. 2 as well as in the pre-latched position as per FIG. 3, a striker element or locking bolt 8 is trapped, namely within a slit 4c between both fork arms 4a, 4b of the rotary latch 4.

The rotary latch 4 can be pivoted around an axis 9. The axis 9 is defined by a shoulder stud or pivot bolt that is anchored into a lock plate 11 holding the locking mechanism 4, 5. The pawl 5 can be pivoted around an axis 10. To define the axis 10, a shoulder stud or pivot bolt is again provided that is connected to the lock plate 11.

The detailed views as per FIGS. 2 and 3 also show an actuator 12, 13. An unlocking/opening mechanism 14, 15 is also provided. The unlocking/opening mechanism 14, 15 for the bonnet 3 and thus the locking mechanism 4, 5 is equipped with a release element 15 provided in the interior of a motor vehicle body of the motor vehicle 1. The release element 15 operates via a fastener 14 on the pawl 5 in the example.

The design is such that in our example where the release element 15 in the interior of the motor vehicle body of the motor vehicle is actuated once or twice via the fastener 14 to lift the pawl 5 off the rotary latch 4 starting from the closed position as per FIG. 2. This corresponds to pawl 5 counterclockwise around its axis 10, as indicated in the associated FIG. 2. After the pawl 15 has been applied, the unlocking/opening mechanism 14, 15 is reset so that the locking mechanism 4, 5 transfers from the closed position as per FIG. 2 to the pre-latched position as per FIG. 3.

By lifting the pawl 5 off the rotary latch 4 in the closed position as per FIG. 2, the spring-loaded rotary latch 4 is pivoted clockwise around its axis 9. Since after finishing the application of the release element 15, the pawl 5 has returned to its original position as per FIG. 2, the pawl 5 can now engage in the pre-latch 7 of the rotary latch 4. By way of contrast, the pawl 5 in the closed position or main latched position as per FIG. 2 has engaged in the main latch 6.

Even with the aid of the actuator 12, 13, the pawl 5 can be lifted off the rotary latch 4. The actuator 12, 13 is provided for the power-driven application of the pawl 5—independent of the unlocking/opening mechanism 14, 15. In the design example, the actuator 12, 13 is a linear actuator 12, 13 that operates via a linear element 13 to the pawl 5. The linear actuator 13 is moved in a linear direction with the aid of a motor or electric motor 12 as an additional part of the actuator 12, 13, as shown in FIG. 3 by the corresponding arrow. In the design example, the actuator 13 is moved to the right in a straight line with the aid of the electric motor 12 and therefore travels against a lug of the pawl 5 so that the pawl 5 is subsequently pivoted counterclockwise around its axis 10 with the aid of the adjusting rod or linear actuator. This is also indicated in FIG. 3 by a corresponding arrow.

Starting from the pre-latched position as per FIG. 3 with the pawl 5 engaged in the pre-latch 7, the application with the aid of the actuator 12, 13 leads to the full release of the rotary latch 4 from the pawl 5. The striker element 8 still trapped in the pre-latched position as per FIG. 3 can then be fully released from the locking mechanism 4, 5 and the bonnet 3 can be opened or swung open as required.

The actuator 12, 13 or its electric motor 12 is connected to a control unit 16. A sensor 17 also emits its signals to the respective common control unit 16. With the aid of the sensor 17, where in the design example it is or can be a switch, the pre-latched position as per FIG. 3 is scanned. A transmission lever or switch lever 18 is provided for this purpose that is pivotable and hinged to the lock plate 11 and follows the movements of the striker element 8. The transmission lever or switch lever 18 is placed permanently in attachment to the striker element 8 with the aid of a spring. With the aid of the sensor or switch 17 in conjunction with the transmission lever 18, it is possible, amongst other things, to capture the pre-latched position as per FIG. 3 with the sensor and transmit it to the control unit 16.

Only once the locking mechanism 4, 5 is actually and perfectly in the pre-latched position as per FIG. 3, does the control unit 16 permit a change in movement of the actuator 12, 13. In addition to this, the positional movement of the actuator 12, 13 is also only implemented or initiated if an operating unit 19 detects an application. The operating unit 19 is an operating unit 19 that impinges the actuator 12, 13 wirelessly. A transmitting/receiving unit 20 may be provided for this purpose that in the design example is located near the motor vehicle bonnet lock 2 or can be integrated into the motor vehicle bonnet lock 2 in question. This quasi motor vehicle transmitting/receiving unit 20 communicates wirelessly with an additional transmitting/receiving unit 21 that is provided and installed in the mobile operating unit 19. This is depicted in the figures by the indicated radio waves or general electromagnetic waves.

The working principle is as follows. To unlock and open the bonnet 3 of the motor vehicle 1, first actuate the release element 15 in the interior of the associated motor vehicle body. This can be realized once or twice. The actuation of the release element 15, via the fastener 14 that has thus been impinged, where it is or can be a control cable or Bowden cable, ensures that the pawl 5 is lifted off the rotary latch 4. The motor vehicle bonnet lock 2 and its locking mechanism 4, 5 is hereby in the closed position as per FIG. 2.

Since the release element 15 only corresponds to a short application of the pawl 5 and is then immediately reset so that the pawl 5 too resumes its original position as per FIG. 2, the spring-loaded rotary latch 4 can only be pivoted around its axis 9 up to the pre-latched position according to FIG. 3. A spring that is not explicitly mentioned is used here that might impinge the bonnet 3 and/or the rotary latch 4. In the pre-latched position, the bonnet 3 is slightly open as shown in FIG. 1 by the dashed line.

The slightly open bonnet 3 ensures that the motor vehicle bonnet lock 2 assumes the pre-latched position as per FIG. 3. The striker element 8 connected to the bonnet 3 is still guided and retained in the slit 4c between both fork arms 4a and 4b of the rotary latch 4 so that the locking mechanism 4, 5 and with it, the motor vehicle bonnet lock 2 are secure without change. The same applies to the bonnet 3.

In order to now, starting from this pre-latched position as per FIG. 3, fully swing open the slightly open 5 bonnet 3, the pawl 5 must be lifted off the rotary latch 4, starting from the pre-latched position as per FIG. 3. The pawl 5 hereby leaves the pre-latch 7 of the rotary latch 4 and can subsequently swing the rotary latch 4 completely open around its axis 9. This process is completed by the aforementioned spring. It is however also possible that the bonnet 3, in its slightly open position as shown by the dashed line as per FIG. 1, is simultaneously kept suspended by the force of the spring. An operator must then reach through the gap between the bonnet 3 and the motor vehicle body and grab the bonnet 3 and actively swing it open.

The latter variant with the quasi suspended bonnet 3 in the pre-latched position as per FIG. 3, has the particular advantage that the bonnet 3 is at least transferred to the dashed and slightly open position if it is deposited very slowly by the operator. For this means that the striker element 8 can swing out the fully open rotary latch 4 that is dashed as per FIG. 3, without force or practically without force until at least in the pre-latched position as per FIG. 3. Starting from the pre-latched position as per FIG. 3, the force of the aforementioned spring should only be applied to reach the main latch position or closed position as per FIG. 2. This means that in this case, the striker element 8 is secured even when the bonnet 3 is set down gently, namely in the mandatory pre-latched position as per FIG. 3 for the described closing process.

When the bonnet 3 is opened, starting from the pre-latched position as per FIG. 3, the bonnet 3 is opened from the pre-latched position with the aid of a power mechanism, with said lifting being activated separately, to lift the pawl 5 off the rotary latch 4. The lifting of the pawl 5 off the rotary latch 4 that is initiated separately by a power mechanism is, according to the invention, achieved with the aid of the actuator 12, 13.

The actuator 12, 13 can hereby only interact with the pawl 5—as described, when the control unit 16 impinging the actuator 12, 13 has determined, as part of a scan with the sensor or switch 17, the perfect registering of the pre-latched position as per FIG. 3. Furthermore, the actuator 12, 13 must be impinged by the operating unit 19 that is separate to the release element 15 in the interior of the motor vehicle 1. The operating unit 19 can be a wireless code that is already in place to open the other doors of the motor vehicle and may therefore be equipped with an additional switch.

In any case, the impingement of the operating unit 19 that is separate to the release element 15 ensures that a corresponding opening signal is emitted by the transmitting/receiving unit 21 of the operating unit 19. This opening signal is received by the transmitting/receiving unit 20 of the motor vehicle body and converted into a corresponding positional movement of the actuator 12, 13 or its linear actuator 13. This does however mean that the operating unit 19 is within the transmitting or receiving range of the transmitting/receiving unit 20 of the motor vehicle body as part of the motor vehicle door lock or motor vehicle bonnet lock 2. This transmitting or receiving range may be closely defined and, in the design example, this means that an operator impinging the operating unit 19 or a driver indicated in FIG. 1 is directly in front of the motor vehicle 1 next to the motor vehicle bonnet lock 2. This ensures that the operator or driver in question, after having impinged the operating unit 19 to open the bonnet 3, does actually grab it and swing it open.

By impinging the actuator 12, 13, the linear actuator 13 in the design example is moved to the right according to the pre-latched position as per FIG. 3 and the pawl 5 lifts off the pre-latch 7 on the rotary latch 4. The rotary latch 4 is now free from pawl 5 and the striker element 8 can be removed from the slit 4c. The bonnet 3 connected to the striker element 8 can therefore be opened and swung open.

In this context it is conceivable that the operator or driver continues to impinge the operating unit 19, thereby lifting the pawl 5 off the rotary latch 4 in the pre-latched position as per FIG. 3 until the operator in question for instance uses his other hand to swing open the bonnet 3 so far that the rotary latch 4 or the locking mechanism 4, 5 is opened, as indicated by the dashed line in FIG. 3. It is however also possible that a single brief actuation of the operating unit 19 is enough to lift the pawl 5 off the rotary latch 4 starting from the pre-latched position as per FIG. 3 and that the rotary latch 4, impinged by the aforementioned spring, automatically swings open around its axis 9 in the direction of the opening. The clockwise direction movement indicated in FIG. 3 corresponds to this.

The first-mentioned method of opening the locking mechanism 4, 5 starting from the pre-latched position with no spring force but by means of manual impingement by the operator is especially advantageous. For this method presumes that the operator or driver not only impinges the operating unit 19 to lift the pawl 5 off the rotary latch 4 but also simultaneously swings open the bonnet 3 in the opening direction. This can for instance mean that the operator uses his left (right) hand to impinge the operating unit 19 and the right (left) hand for the bonnet 3. This ensures that the bonnet 3 is opened or must be opened in this instance. If the operator should then release the bonnet 3 or lower it slowly, then the striker element 8 that interacts reciprocally with the locking mechanism 4, 5 at least ensures that the locking mechanism 4, 5 assumes the pre-latched position (again) as per FIG. 3. The motor vehicle door lock or motor vehicle bonnet lock 2 is hereby secure. This method does not require any force from a spring and the striker element transfers the locking mechanism 4, 5 easily or without force into the pre-latched position as per FIG. 3.

The invention claimed is:

1. A motor vehicle door lock comprising:
a locking mechanism having a rotary latch and a pawl;
a bonnet having a striker element which interacts with the pawl;
the locking mechanism further including a switch lever that is pivotable to follow movement of the striker element, the switch lever being biased directly against the striker using a spring during movement of the locking mechanism;
an unlocking/opening mechanism for the bonnet;
a sensor configured to detect a pre-latched position of the locking mechanism by the switch lever engaging with the sensor while the switch lever is biased directly against the striker; and
a release element provided in an interior of a motor vehicle body, the release element being configured for opening the bonnet and for being operated twice,
wherein the locking mechanism and the bonnet are transferred to the pre-latched position after the release element has been operated at least once, with the striker element being trapped while the bonnet is opened from the pre-latched position by lifting the pawl off the rotary latch with the aid of a power mechanism,
wherein said lifting of the pawl is activated by the power mechanism and separately relative to the release element,
wherein the power mechanism is an actuator that is provided for the power-driven actuation of the pawl,
wherein the actuator is in communication with an operating unit that is separately arranged relative to the release element,
wherein the sensor and the power mechanism are connected to a common control unit that only permits the power mechanism to lift the pawl off the rotary latch if the sensor has signaled that the locking mechanism is in the pre-latched position of the locking mechanism;

wherein the rotary latch is a fork latch including a first fork arm having a first recess and a second fork arm having a second recess, the first and second fork arms defining opposite sides of a slit that receives the striker element, and in a main latched position the pawl engages against the first recess of the first fork arm and in the pre-latched position the pawl engages against the second recess of the second fork arm; and wherein engagement of the pawl with the first recess of the first fork arm and with the second recess of the second fork arm is on an opposite side of the striker element relative to an axis of rotation of the rotary latch.

2. The motor vehicle door lock according to claim 1, wherein the actuator is a swivel and/or a linear actuator.

3. The motor vehicle door lock according to claim 2, wherein the actuator includes an electric motor and the swivel actuator and/or the linear actuator.

4. The motor vehicle door lock according to claim 1, wherein the operating unit communicates with the actuator wirelessly.

5. The motor vehicle door lock according to claim 1, wherein the release element is actuated once to transfer the locking mechanism to the pre-latched position and the bonnet is subsequently opened by the operating unit.

6. The motor vehicle door lock according to claim 1, wherein a pawl engages in a pre-latched position as soon as the impingement of an operating unit is interrupted.

7. The motor vehicle door lock claim 1, wherein the actuator is configured to lift the pawl out of the pre-latched position and/or out of the main latched position.

8. The motor vehicle door lock according to claim 1, wherein the striker element of the bonnet at least reaches the pre-latched position when the bonnet is moved by an operator.

9. The motor vehicle door lock according to claim 1, wherein the operating unit is configured as a wireless key that is used to unlock the motor vehicle door lock.

10. The motor vehicle door lock according to claim 1, wherein the operating unit is remote controllable.

11. The motor vehicle according to claim 1, wherein the actuator includes a first transmitting/receiving unit and the operating unit includes a second transmitting/receiving unit that is in wireless communication with the first transmitting/receiving unit.

12. The motor vehicle according to claim 11, wherein the first transmitting/receiving unit is arranged proximate the motor vehicle door lock or is integrated into the motor vehicle door lock.

13. A motor vehicle door lock comprising:
a locking mechanism having a rotary latch and a pawl;
a bonnet having a striker element which interacts with the pawl;
the locking mechanism further including a switch lever that is pivotable to follow movement of the striker element, the switch lever being biased directly against the striker using a spring during movement of the locking mechanism;
an unlocking/opening mechanism for the bonnet;
a release element provided in an interior of a motor vehicle body, the release element being configured for opening the bonnet and for being operated twice, and
a sensor configured to detect a pre-latched position of the locking mechanism by the switch lever engaging with the sensor while the switch lever is biased directly against the striker,
wherein the locking mechanism and the bonnet are transferred to the pre-latched position after the release element has been operated at least once, with the striker element being trapped,
wherein the bonnet is moved from the pre-latched position by lifting the pawl in a separate activation relative to an activation of the release element,
wherein the pawl is lifted by a power mechanism in response to communication with a wireless key only if the sensor has signaled that the locking mechanism is in the pre-latched position of the locking mechanism;
wherein the rotary latch is a fork latch including a first fork arm having a first recess and a second fork arm having a second recess, the first and second fork arms defining opposite sides of a slit that receives the striker element, and in a main latched position the pawl engages against the first recess of the first fork arm and in the pre-latched position the pawl engages against the second recess of the second fork arm; and
wherein engagement of the pawl with the first recess of the first fork arm and with the second recess of the second fork arm is on an opposite side of the striker element relative to an axis of rotation of the rotary latch.

* * * * *